United States Patent
Couture-Gagnon et al.

(10) Patent No.: US 8,310,484 B2
(45) Date of Patent: Nov. 13, 2012

(54) EFFICIENT PROCESSING OF OPERATOR GRAPHS REPRESENTING THREE-DIMENSIONAL CHARACTER ANIMATION

(75) Inventors: Jérôme Couture-Gagnon, Longueuil (CA); Peter Zion, Montreal (CA); Ian Stewart, Pierrefonds (CA); Ronald Beirouti, Outremont (CA); Dominic Laflamme, Montreal (CA); Maxime Beaudry, Verdun (CA)

(73) Assignee: AUTODESK, Inc., San Rafael, CA (US)

( * ) Notice: Subject to any disclaimer, the term of this patent is extended or adjusted under 35 U.S.C. 154(b) by 1082 days.

(21) Appl. No.: 11/881,202

(22) Filed: Jul. 26, 2007

(65) Prior Publication Data

US 2008/0028414 A1 Jan. 31, 2008

Related U.S. Application Data

(60) Provisional application No. 60/834,372, filed on Jul. 31, 2006.

(51) Int. Cl.
*G06T 13/00* (2011.01)
(52) U.S. Cl. ...................................................... 345/473
(58) Field of Classification Search ................... 345/473
See application file for complete search history.

(56) References Cited

U.S. PATENT DOCUMENTS

| | | | |
|---|---|---|---|
| 5,808,625 A | | 9/1998 | Picott et al. |
| 6,574,788 B1 * | | 6/2003 | Levine et al. ................. 716/102 |
| 7,409,656 B1 * | | 8/2008 | Ruehl ........................... 716/112 |
| 2004/0117730 A1 | | 6/2004 | Ibrahim et al. |
| 2006/0274070 A1 * | | 12/2006 | Herman et al. ............... 345/474 |

FOREIGN PATENT DOCUMENTS

| | | |
|---|---|---|
| JP | 06-044209 | 2/1994 |
| JP | 2001-318798 | 11/2001 |

OTHER PUBLICATIONS

English Translation of JP 2001-318798 (provided as explanation of relevance).
English Translation of JP 06-044209 (provided as explanation of relevance).

(Continued)

*Primary Examiner* — Xiao M. Wu
*Assistant Examiner* — Scott E Sonners
(74) *Attorney, Agent, or Firm* — Patterson & Sheridan, LLP

(57) ABSTRACT

An operator graph representing three-dimensional animation can be analyzed to identify subgraphs of the operator graph in which operators are not required to operate in a serialized manner. Such a condition may arise, for example, when two operators are not dependent on each other for data. This condition may arise when the operators are operating on different elements in a scene. Such operators may be evaluated in parallel. To identify these operators, a dependency graph is created. The dependency graph indicates which operators have inputs that are dependent on outputs provided by other operators. Using this graph, operators that are independent of each other can be readily identified. These operators can be evaluated in parallel. In an interactive editing system for three-dimensional animation or other rich media, such an analysis of an operator graph would occur when changes are made to the animation. The creation and use of the dependency graph enables faster processing of a scene while changes to the scene are being made.

18 Claims, 3 Drawing Sheets

OTHER PUBLICATIONS

Chong, et al. "Learning Maya, Version 1.0," Jan. 31, 1998, XP002550822, pp. 82-102, retrieved from the Internet: URL:http://rs463.rap1dshare.com/f1les/274071540/maya-3d-tutorial.rar.

Walker, Henry M. "Abstract Data Types: Specifications, Implementations, and Applications—Dependency Graphs and Ability to Parallelize Computations"XP002550823, Dec. 31, 1996, p. 470, retrieved from the Internet: URL: http://tinyurl.com/dependencygraph.

Guabtni, et al. "Multiple Instantiations in a Dynamic Workflow Environment," Jun. 7, 2004, XP002550824, retrieved from the Internet: URL:http://cat.inist.fr/?aModele=afficheN&cps1dt=15935846.

EP Search Report, Application No. EP 07 25 2884, mailed Nov. 6, 2009.

* cited by examiner

EFFICIENT PROCESSING OF OPERATOR GRAPHS REPRESENTING THREE-DIMENSIONAL CHARACTER ANIMATION

CROSS REFERENCE TO RELATED APPLICATION

This application claims right of priority to and the benefit, under 35 USC §119(e), of prior filed provisional application Ser. No. 60/834,372, filed on Jul. 31, 2006.

BACKGROUND

Three-dimensional computer-generated animation typically is created by defining a scene with one or more objects. An object may be defined in a number of ways, such as using a skeleton and associated mesh, NURBS surfaces, particles and the like. The position, orientation, scale and/or other properties of each object may be animated over time. The surface of each object also may be textured through a process called shading or rendering to make the object appear realistic. The complexity of a scene may vary depending on the number of objects, the complexity of each object and the complexity of the animation. Input scene data of a variety of different types is processed, using a number of different operations, to edit three-dimensional content or to produce a two-dimensional image (or sequence of such images) representing a view of the three-dimensional scene.

Most systems for authoring three-dimensional computer-generated animation represent the combination of operations defining a scene using a form of operator graph. Each node in an operator graph represents an operation on data. Operators may vary any parameter that defines the scene. A node can represent an operation that is implemented as an explicitly coded function of a computer program or can represent an operation that is defined by another operator graph.

These operator graphs are designed to enable the scene to be created using a variety of types of three-dimensional data, including, but not limited to, NURBS surfaces, meshes, particles, skeletons, properties, constraints, etc. In other words, each operator may operate on different kind of data than other operators. Some operators are more complex than others. For example, some operators may perform simple deformations, whereas others may define complex constraints between three-dimensional data. Thus, operator graphs can be characterized as heterogeneous. As a result, each operation in the operator graph is typically performed independently of the others; however, each operation is typically implemented to exploit any parallelism that is possible for that operation.

Accordingly, the processing resources required to display animation are significant. There are different needs, however, for interactive editing than for playback. In particular, editing tools represent data in more flexible ways that allow interactive changes that modify the operator graph, such as adding, removing and/or modifying geometrical elements, whereas playback caches and optimizes data in memory to allow fast read access by viewing processes and may involve compiling the operator graph for efficient playback. As a result, editing tools and playback systems arrange data in memory and process an operator graph differently.

Developments in computer architectures are resulting in more powerful computers with many processors, including one or more central processing units (CPU), and/or one or more graphics processing units (GPU), and/or one or more physics processing units (PPU) and/or one or more cell processors (a multi-core CPU). While these processing resources improve the capability of a system to support interactive editing or playback, it is a challenge to use these resources efficiently.

SUMMARY

An operator graph representing three-dimensional animation can be analyzed to identify subgraphs of the operator graph in which operators are not required to operate in a serialized manner. Such a condition may arise, for example, when two operators are not dependent on each other for data. This condition may arise when the operators are operating on different elements in a scene. Such operators may be evaluated in parallel. To identify these operators, a dependency graph is created. The dependency graph indicates which operators have inputs that are dependent on outputs provided by other operators. Using this graph, operators that are independent of each other can be readily identified. These operators can be evaluated in parallel. In an interactive editing system for three-dimensional animation or other rich media, such an analysis of an operator graph would occur when changes are made to the animation. The creation and use of the dependency graph enables faster processing of a scene while changes to the scene are being made.

Another condition under which serialization is not required arises, for example, when a second operator, which uses data written by a first operator, can begin processing the data written by the first operator before the first operator completes processing the data. Typically, this condition arises when the operators operate on homogeneous data and perform simple manipulations such as spatial displacements. Such operators can be evaluated in a pipelined fashion with no synchronization points required to serialize computation. Multiple instantiations of the subgraphs' operators also permit parallel evaluation of the subgraph on different segments of the data.

This parallel, pipelined operation is possible because a significant part of animation operators are animated deformations of explicit geometrical data. The explicit data are the points or vertices of geometrical objects, such as meshes, particles or point clouds, NURBS, bones, etc. The uniformity of this data and limited dependencies in these operation makes parallel, pipelined processing possible. Each operation may operate internally on chunks of the data, enabling parallelism. In a chain of operations, one operation typically does not need to wait for a prior operation to complete processing all of the data, enabling pipelined operation. Thus, operators are concatenated to produce operator sequences that do not need to synchronize at the end of each operator, which would serialize their computations.

DETAILED DESCRIPTION

Figure 1:
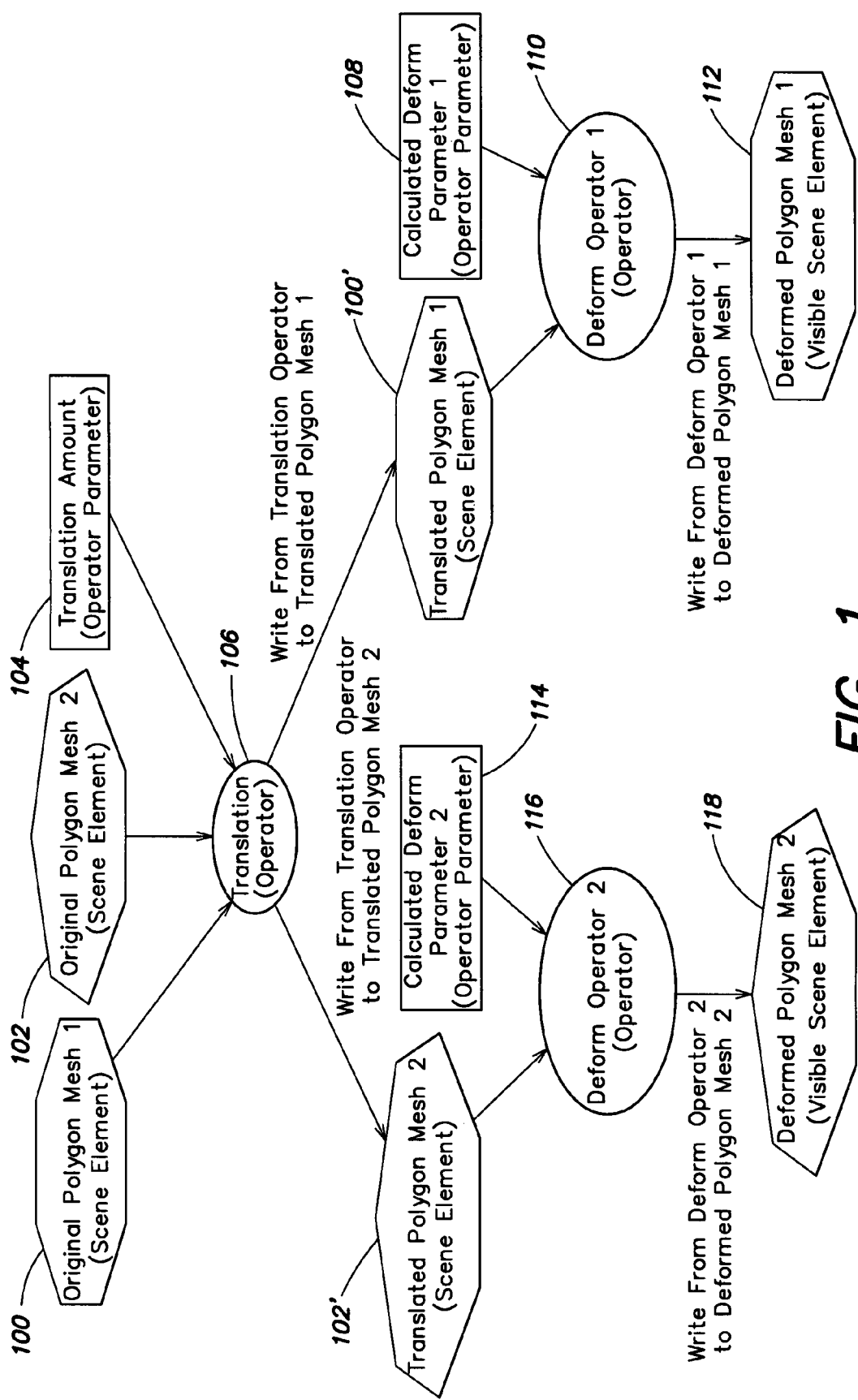
FIG. 1 is a diagram of an operator graph that represents processing applied to create animation.

Referring now to FIG. 1, an example operator graph will now be described. In this operator graph, the data also is illustrated for clarity. The operator graph typically includes scene elements (meshes, bones, particles, etc.), parameters (positions, angles, etc.) and operators. Operators create or modify scene elements by taking values of parameters as well as other scene elements and performing some sort of mathematical or geometrical operation depending on the operator. Some operator graphs implicitly represent that data as source data to the graph, such that data are not nodes in the graph.

In FIG. 1, two scene elements 100 and 102 are provided. Each is a polygon mesh. A translation amount (a parameter) 104 also is provided. These data are the inputs to a translation operator 106. The translation operator produces a first translated polygon mesh 100' and a second translated polygon mesh 102' by translating, respectively, meshes 100 and 102 by the translation parameter. A calculated deformation parameter 108 and the translated polygon mesh 100' are inputs to a deform operator 110, which produces a deformed polygon mesh 112 as its output. Similarly, a calculated deformation parameter 114 and the translated polygon mesh 102' are inputs to a deform operator 116, which produces a deformed polygon mesh 118 as its output. This operator graph describes a scene in which two objects are translated the same amount, but are separately deformed. Lines with arrows coming out of operators in the operator graph signify write operations.

Using the operator graph of FIG. 1, it will be understood that an operator, such as deform operator 110, may by implemented as a single function in a computer program. It is also possible that this operator may itself represent a combination of operators defined by an operator graph. Thus, an operator graph may have several "levels" of nesting, which, at the top most level, represents the most abstract view of the operation performed by the operator graph. Each node may in turn be represented by an operator graph. These nested operator graphs may be understood to be at a level "below" the top most level operator graph.

To process the operator graph, each operator is assumed to require serialization or synchronization. That is, it is assumed that each operator completes process all of its input data and writes all of its output data before the next operator in the graph can read its output data. The graph is traversed to identify those subgraphs in which, due to the nature of the data and of the operation, this limitation may be removed to permit pipelined or parallel operation. In one simplification, each node in an operator graph at the top most level of the operator graph is evaluated in a serial manner. Nodes that are defined by other operator graphs may be processed to find ways to parallelize and pipeline its evaluation.

To analyze the graph, the write operations performed by the operators are used to create a dependency graph. In particular, starting from the outputs of the operator graph, the graph is traversed to identify, for each operator, each operation that is performed that creates or modifies data. This write operation is a node in the dependency graph. By traversing the operator graph, other operators that use the results of this write operation are identified and are connected to this node in the dependency graph. In particular, all of the inputs (parameters and other scene elements) which the operator reads in order to perform its write are identified. Each of these inputs is followed through the operator graph until one or more writes from other operators is found; these writes are the ones on which that operator depends. It is possible for a single operator to write multiple scene elements; since an operator in general cannot be run multiple times in parallel, all of the writes of a given operator are dependent on one another in sequence. That is, the second write is dependent on the first, the third on the second, and so on. For an operator with multiple writes, each write is only dependent on the inputs it actually uses to perform the specific write. If there are loops in the operator graph—two operators which depend on each other's writes as inputs—these loops are broken when building the dependency graph. In particular, when the dependency graph is built, while traversing the operator graph each node is marked as it is visited. This traversal down one path of the graph terminates when it reaches a node in the operator graph that has already been visited.

Figure 2:
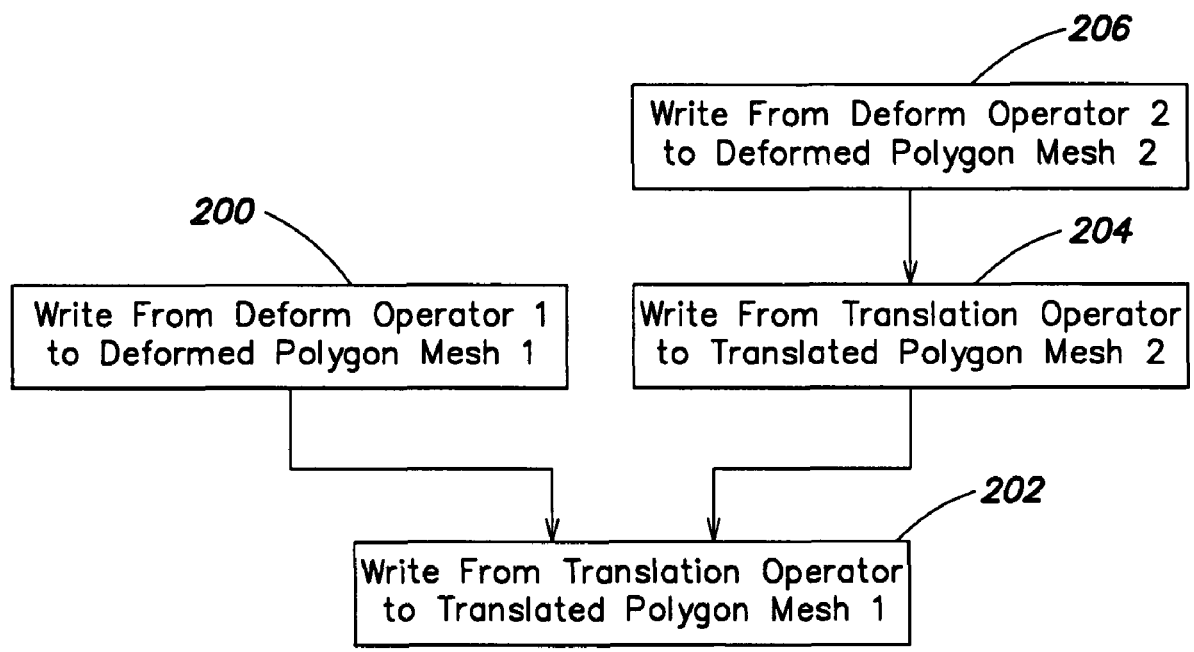
FIG. 2 is a diagram of a dependency graph generated from analysis of the operator graph.

A dependency graph corresponding to FIG. 1 is shown in FIG. 2. In this graph the arrows mean "depends on". Thus the write operation 200 performed by deform operator 110 depends on the write operation 202 performed by translation operator 106. The write operation 202 from the translation operator 106 can occur only after the translation operator 106 processes and writes (204) the other mesh first. Thus, write operation 202 is dependent upon write operation 204. The write operation 206 from the other deform operator 116 also depend on completion of the write operation 204.

After the dependency graph is built, the operations may be executed in a greedy fashion. First write operation 202 is executed. Then write operations 204 and 200 may be executed in parallel. As soon as write operation 204 is done, write operation 206 may be started, even if write 200 has not yet finished. Once both write operation 206 and write operation 200 have finished, the processing is complete.

Any portions of the dependency graph that are independent can be executed in parallel, even on heterogeneous resources. In general, when one operation depends on the completion of two other operations executed in parallel, a synchronization process is use to ensure that both of the operations have completed. This type of synchronization can be costly because parallelism is reduced when one operation takes longer than the other, in which case it may not be possible to perform other operations in parallel while waiting for the longer operation to complete. However, if an operation depends on only one other operation being completed, there is no synchronization necessary, since the second operation is simply executed after the first operation of the same processor.

In some cases, an operator may write data in a manner so as to permit subsequent operators to begin processing its output, and thus the operators evaluate data in a pipelined fashion with no synchronization points required to serialize computation. For example, one such operation that is internally pipelined is enveloping, whereby a polygon mesh is deformed based on the positions of bones in a skeleton. Each point on the mesh can be repositioned independent of every other point. Because it is an expensive and yet very common operation the enveloping operator may be implemented using internal pipelining, the points on the mesh are deformed in large sets in parallel.

Figure 1A:
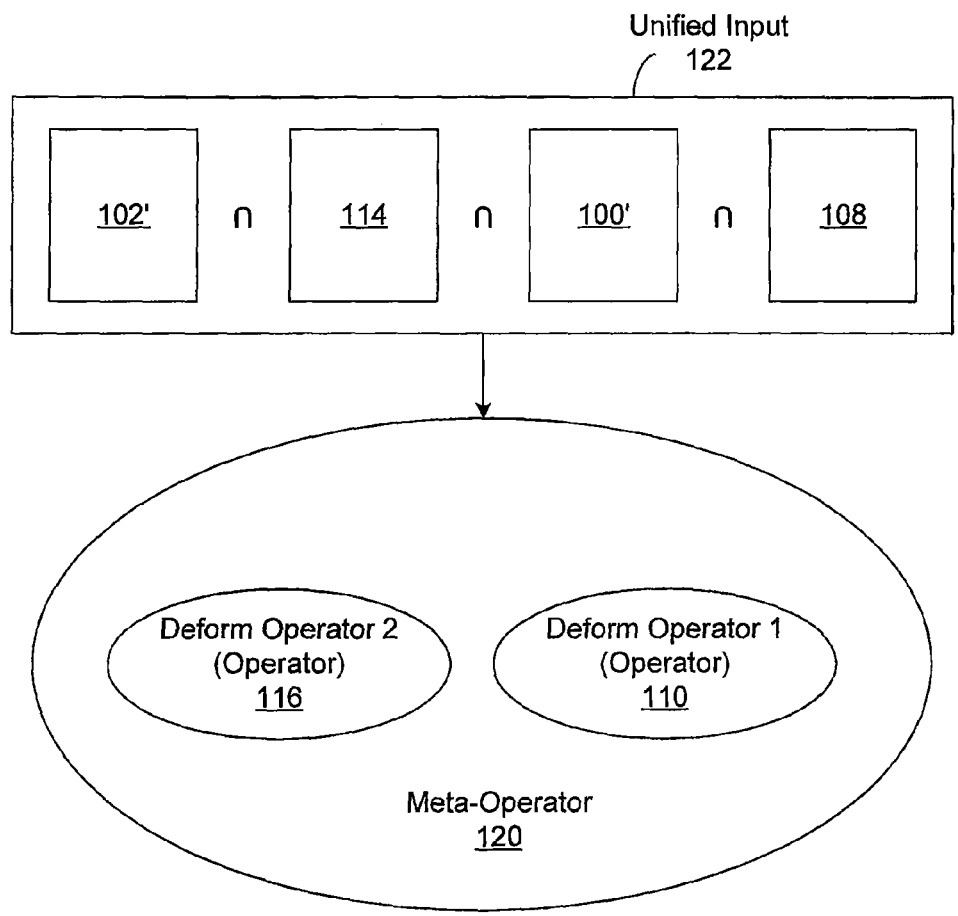

Given these processes, subgraphs made of connected operators, such as operator 116 and operator 110, working on compatible sets of independent elements are identified. These subgraphs may be virtually merged and treated as one meta-operator, such as meta-operator 120 shown in FIG. 1A, in the dependency graph, assigning the union of the read and write dependencies of the merged operators, such as unified input 122 shown in FIG. 1A to the meta-operator. This meta-node is identified as being able to manage multiple parallel operations internally.

In an interactive editing system for three-dimensional animation or other rich media, such an analysis of an operator graph would occur when changes are made to the animation and three-dimensional data content. The dynamic creation and use of the dependency graph during interactive editing enables faster processing of a scene while changes to the scene are being made because the independent subgraphs are dynamically updated.

Each subgraph is evaluated in parallel and manages its own memory. The memory regions allocated to each subgraph will not change until the subgraphs change due to scene changes.

Subgraph and caches are invariant and ready for execution without any need to return to the operating system for allocation thus reducing the time to queue to processing units.

The various components of the system described herein may be implemented as a computer program using a general-purpose computer system. Such a computer system typically includes a main unit connected to both an output device that displays information to a user and an input device that receives input from a user. The main unit generally includes one or more processors connected to a memory system via an interconnection mechanism. The one or more processors include one or more central processing units (CPU), and/or one or more graphics processing units (GPU), and/or one or more physics processing units (PPU) and/or one or more cell processors (a multi-core CPU), providing a heterogeneous processing environment. The input device and output device also are connected, to the processor and memory system via the interconnection mechanism.

One or more output devices may be connected to the computer system. Example output devices include, but are not limited to, a cathode ray tube (CRT) display, liquid crystal displays (LCD) and other video output devices, printers, communication devices such as a modem, and storage devices such as disk or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services.

A memory system typically includes a computer readable medium. The medium may be volatile or nonvolatile, writeable or nonwriteable, and/or rewriteable or not rewriteable. A memory system stores data typically in binary form. Such data may define an application program to be executed by the microprocessor, or information stored on the disk to be processed by the application program. The invention is not limited to a particular memory system.

A system such as described herein may be implemented in software or hardware or firmware, or a combination of the three. The various elements of the system, either individually or in combination may be implemented as one or more computer program products in which computer program instructions are stored on a computer readable medium for execution by a computer. Various steps of a process may be performed by a computer executing such computer program instructions. The computer system may be a multiprocessor computer system or may include multiple computers connected over a computer network. The invention may be implemented using separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A computer-implemented method for processing character animation defined by a graph of operators, comprising:
    receiving an operator graph that represents a three-dimensional animation and includes a set of operators;
    identifying a first subgraph of the operator graph that includes a first operator associated with inputs that are independent of outputs associated with a second operator included in the first subgraph;
    evaluating the first operator and the second operator in parallel within one or more processors included within a processing environment;
    identifying a second subgraph of the operator graph that includes a third operator and a fourth operator that are both associated with a particular set of inputs; and
    merging the third operator and the fourth operator to generate a meta-operator that receives the particular set of inputs and manages the evaluation of the third operator and fourth operator in parallel within the processing environment.

2. The method of claim 1, wherein the one or more processors include a heterogeneous processing resources.

3. The method of claim 1, further comprising:
    creating multiple instantiations of the first subgraph for parallel evaluation on different segments of the inputs associated with the first operator and inputs associated with the second operator.

4. The method of claim 1, further comprising managing memory associated with the first subgraph, such that memory regions allocated to the first subgraph change only if the operator graph changes in response to changes to a scene defined by a user.

5. The method of claim 1, further comprising dynamically updating the operator graph when the three-dimensional animation is modified.

6. A computer-implemented method for processing character animation defined by a graph of operators, comprising:
    receiving an operator graph that represents a three-dimensional animation and includes a set of operators and a set of data nodes;
    identifying first subgraph of the operator graph in which a second operator included in the first subgraph, which uses data written by a first operator included in the first subgraph, can begin processing the data written by the first operator before the first operator completes processing the data;
    evaluating the first operator and the second operator within the first subgraph in a pipelined fashion within one or more processors of a processing environment;
    identifying a second subgraph of the operator graph that includes a third operator and a fourth operator that are both associated with a particular set of inputs; and
    merging the third operator and the fourth operator to generate a meta-operator that receives the particular set of inputs and manages the evaluation of the third operator and fourth operator in parallel within the processing environment.

7. The method of claim 6, wherein evaluating the first operator and the second operators includes using heterogeneous processing resources.

8. The method of claim 6, further comprising: creating multiple instantiations of the first subgraph for parallel evaluation on different segments of the data.

9. The method of claim 8, further comprising managing memory associated with the first subgraph, such that memory regions allocated to each subgraph change only if the operator graph changes in response to changes to a scene defined by a user.

10. The method of claim 6, further comprising dynamically updating the operator graph when the three-dimensional animation is modified.

11. A computer program product, comprising:
a non-transitory computer readable medium; and
computer program instructions stored on the computer readable medium that, when processed by a computer, instruct the computer to perform a method for processing character animation defined by a graph of operators, comprising:
receiving an operator graph that represents a three-dimensional animation and includes a set of operators; and a set of data nodes;
identifying a first subgraph of the operator graph that includes a first operator associated with inputs that are independent of outputs associated with a second operator included in the first subgraph;
evaluating the first operator and the second operator in parallel within one or more processors of a processing environment;
identifying a second subgraph of the operator graph that includes a third operator and a fourth operator that are both associated with a particular set of inputs; and
merging the third operator and the fourth operator to generate a meta-operator that receives the particular set of inputs and manages the evaluation of the third operator and fourth operator in parallel within the processing environment.

12. The computer program product of claim 11, further comprising: creating multiple instantiations of the first subgraph for parallel evaluation on different segments of the data.

13. The computer program product of claim 11, further comprising managing memory associated with the first subgraph, such that memory regions allocated to the first subgraph change only if the operator graph changes in response to changes to a scene defined by a user.

14. The computer program product of claim 11, further comprising dynamically updating the operator graph when the three-dimensional animation is modified.

15. A computer program product, comprising:
a non-transitory computer readable medium; and
computer program instructions stored on the computer readable medium that, when processed by a computer, instruct the computer to perform a method for processing character animation defined by a graph of operators, comprising:
receiving an operator graph that represents a three-dimensional animation and includes a set of operators and a set of data nodes;
identifying first subgraph of the operator graph in which a second operator included in the first subgraph, which uses data written by a first operator included in the first subgraph, can begin processing the data written by the first operator before the first operator completes processing the data;
evaluating the first and second operators within the first subgraph in a pipelined fashion;
identifying a second subgraph of the operator graph that includes a third operator and a fourth operator that are both associated with a particular set of inputs; and
merging the third operator and the fourth operator to generate a meta-operator that receives the particular set of inputs and manages the evaluation of the third operator and fourth operator in parallel within the processing environment.

16. The computer program product of claim 15, further comprising:
creating multiple instantiations of the first subgraph for parallel evaluation on different segments of the data.

17. The computer program product of claim 16, further comprising managing memory associated with the first subgraph, such that memory regions allocated to the first subgraph change only if the operator graph changes in response to changes to a scene defined by a user.

18. The computer program product of claim 15, further comprising dynamically updating the operator graph when the three-dimensional animation is modified.

* * * * *